United States Patent [19]
Raynes

[11] 4,219,255
[45] Aug. 26, 1980

[54] TEMPERATURE COMPENSATED LIQUID CRYSTAL DEVICES

[75] Inventor: Edward P. Raynes, Malvern, England

[73] Assignee: The Secretary of State for Defence in Her Britannic Majesty's Government of the United Kingdom of Great Britain and Northern Ireland, United Kingdom

[21] Appl. No.: 853,477

[22] Filed: Nov. 21, 1977

[30] Foreign Application Priority Data

Nov. 25, 1976 [GB] United Kingdom ............... 49285/76

[51] Int. Cl.$^2$ .......................... G02F 1/13; C09K 3/34
[52] U.S. Cl. .................................. 350/346; 252/299; 252/408; 350/330
[58] Field of Search ................ 252/299, 408; 350/346, 350/350, 351

[56] References Cited

U.S. PATENT DOCUMENTS

| | | | |
|---|---|---|---|
| Re. 28,806 | 5/1976 | Saeva et al. | 252/299 |
| 3,781,088 | 12/1973 | Tsukamoto et al. | 350/346 |
| 3,790,251 | 2/1974 | Wysocki et al. | 350/346 |
| 3,792,915 | 2/1974 | Oh et al. | 350/346 |
| 3,891,307 | 6/1975 | Tsukamoto et al. | 350/346 |
| 3,947,375 | 3/1976 | Gray et al. | 252/299 |
| 3,951,846 | 4/1976 | Cavrilovic | 252/299 |
| 3,973,830 | 8/1976 | Tsukamoto et al. | 252/299 |
| 3,977,769 | 8/1976 | Tsukamoto et al. | 252/299 |
| 4,016,094 | 4/1977 | Tsukamoto et al. | 252/299 |
| 4,017,416 | 4/1977 | Inukai et al. | 252/299 |
| 4,032,219 | 6/1977 | Constant et al. | 252/299 |
| 4,035,056 | 7/1977 | Coates et al. | 252/299 |
| 4,077,260 | 3/1978 | Gray et al. | 252/299 |
| 4,083,797 | 4/1978 | Oh | 252/299 |
| 4,112,239 | 9/1978 | Dubois et al. | 252/299 |
| 4,113,647 | 9/1978 | Coates et al. | 252/299 |
| 4,119,558 | 10/1978 | Coates et al. | 252/299 |

OTHER PUBLICATIONS

Hareng, M., et al., Appl. Phys. Lett., vol. 25, No. 12, pp. 680–685, (1974).
Kahn, F. J., Appl. Phys. Lett., vol. 22, No. 3, pp. 111–113, (1973).
Gray, G. W., et al., Mol. Cryst. Liq. Cryst., vol. 37, pp. 189–211, (1976), Presented at 6th Liq. Cryst. Conf., Kent, Ohio (Aug. 1976).

*Primary Examiner*—Teddy S. Gron
*Attorney, Agent, or Firm*—Stevens, Davis, Miller & Mosher

[57] ABSTRACT

A phase change liquid crystal device comprising a layer of liquid crystal material contained between two transparent slides which carry electrode structures for applying a voltage across the layer. The liquid crystal material is a mixture of nematic and cholesteric material having a smectic to cholesteric transition just below the operating temperature range of the device. This provides a cholesteric pitch change to compensate for changes with temperature in the elastic twist and dielectric constants.

5 Claims, 7 Drawing Figures

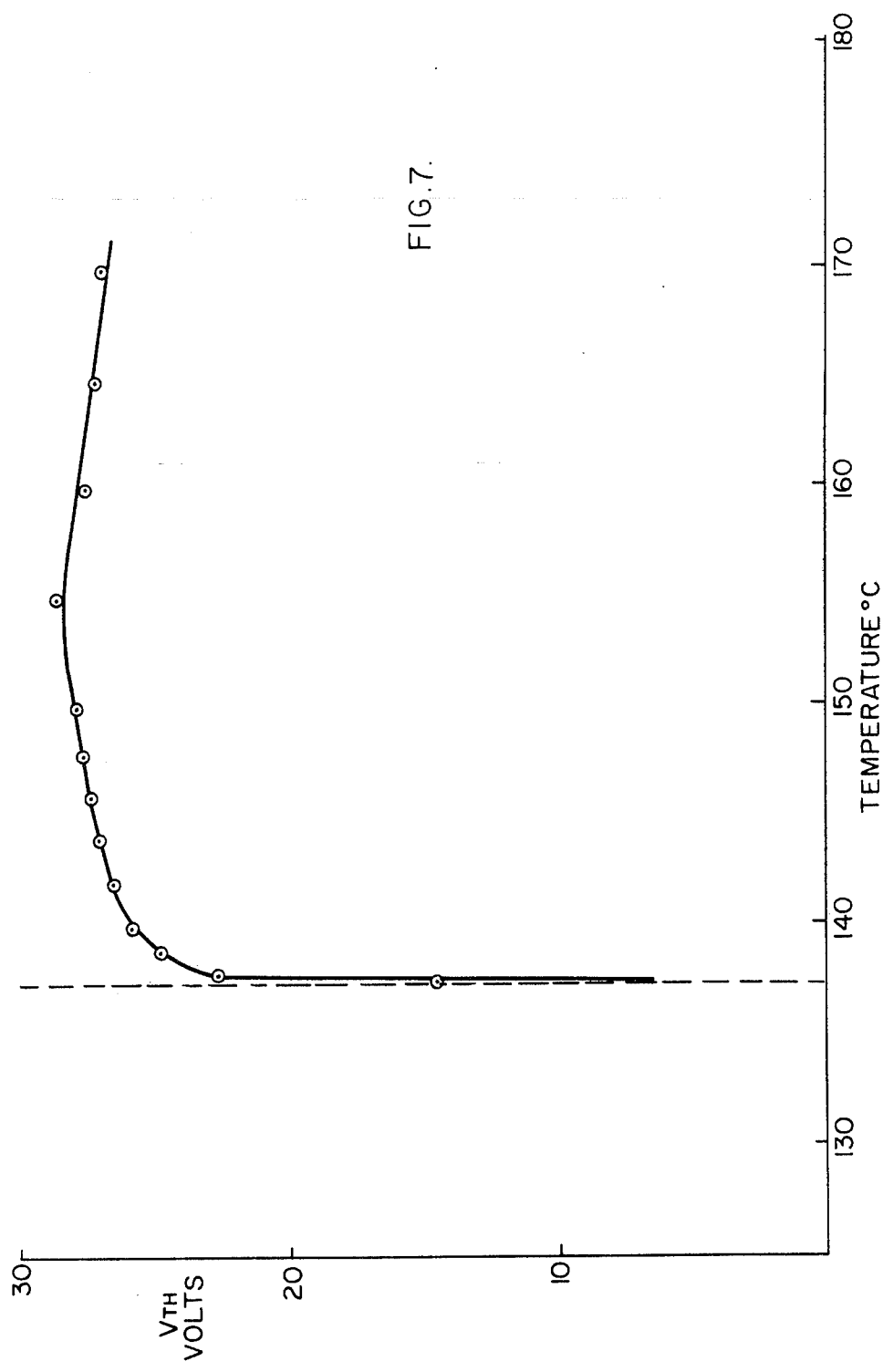

TEMPERATURE COMPENSATED LIQUID CRYSTAL DEVICES

This invention relates to temperature compensated liquid crystal devices.

A typical liquid crystal device comprises a thin layer of a liquid crystal material sandwiched between two glass slides coated on their inner surfaces with transparent sheet electrodes. Application of a voltage across the liquid crystal layer causes a re-orientation of molecules in the layer. In a phase change effect device this application of a voltage above a threshold value causes the liquid crystal material to change from a light scattering cholesteric phase to a transmissive nematic phase. Removal of the voltage allows the material to relax back to the cholesteric phase. The material used in phase change devices is usually a mixture of nematic and cholesteric material since diluting the cholesteric with nematic material lowers the voltage required to change the mixture from a cholesteric, off, condition to a nematic, on, condition. Hence the liquid crystal material in a phase change device may be termed a cholesteric mixture although it contains both cholesteric and nematic material.

Large displays are usually constructed and addressed in a matrix manner, i.e. the electrodes on each slide are arranged in parallel rows and columns as strips with row strips on one slide orthogonal to column strips on the other slide so that a plurality of electrode intersections are formed. By applying a voltage to a particular row and column a liquid crystal at a particular intersection is addressed. Various methods have been proposed for addressing these large displays. One example is described in U.K. patent application No. 53,685/74, another example is in U.K. patent application 39,031/75, both involve applying a voltage around the threshold value across an electrode intersection and therefore a liquid crystal material is required that maintains a sensibly constant threshold voltage with variations in temperature.

The number of intersections that can be matrix addressed depends on how close the sustaining voltage is to the threshold voltage. The larger the variation in threshold voltage with temperature the smaller the number of intersections that can be addressed.

According to this invention a liquid crystal phase change device includes a mixture of nematic and cholesteric liquid crystal materials which mixture is, in a normal operating temperature range, cholesteric in the absence of an applied voltage and nematic when a suitable voltage is applied wherein the mixture has a smectic to cholesteric phase change around ambient temperature or just below normal operating temperatures.

The smectic to cholesteric phase change may lie within the temperature range 15° C. to 22° C. for a device used indoors and a lower range e.g. 10° C. to 15° C. for a device used in lower ambient temperatures.

The cholesteric mixture may be a mixture of at least one material having a nematic phase at or below normal operating temperatures with at least one material having a cholesteric phase at or below normal operating temperatures. A typical operating temperature is 20° C. to 50° C. Well below the operating temperature the mixture has a solid to smectic transition and above this temperature range the mixture has a cholesteric to isotropic transition. The operating temperature will depend upon the working environment of a display i.e. indoors or outside. If used outside the temperature range may be below 20° C. For displays incorporated into electronic equipment the operating temperature may exceed 60° C.

The nematic mixture may itself have a smectic to nematic phase change around ambient temperature.

The cholesteric mixture has a positive anisotropy although components in the mixture may have negative anisotropy whilst the other components have positive anisotropy.

The invention will now be described by way of example only with reference to the accompanying drawings in which:

FIGS. 3 to 7 are graphs showing variation of threshold voltage with temperature for a number of liquid crystal mixtures.

Figure 1:
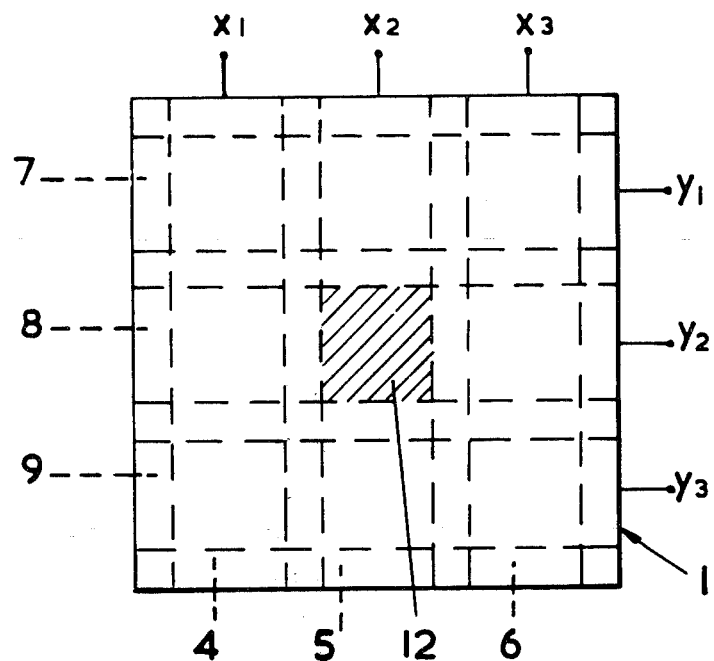
FIG. 1 is a front view of a three by three matrix display.
Figure 2:
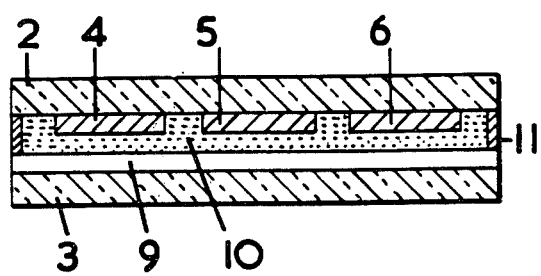
FIG. 2 is a sectional view of FIG. 1.

As shown in FIGS. 1 and 2 a cell 1 comprises two glass slides 2, 3. The slide 2 carries three transparent ribbon shaped electrodes 4, 5, 6 forming column or x electrodes whilst the slide 3 carries similar y electrodes 7, 8, 9 forming row electrodes. Typically the electrodes are a mixture of tin and indium oxide deposited as a 500 Å thick continuous layer and etched to the desired shape. Between the slides 2, 3 is a 12 μm thin layer 10 of a cholesteric liquid crystal mixture. An epoxy resin adhesive 11 is used to seal the edge of the cell 1.

If say the centre intersection $x_2y_2$ is to be addressed, i.e. made light scattering, whilst the remaining intersections appear transparent then a 3 phase voltage supply may be used as follows and as described in U.S. Pat. No. 4,109,241. The three phases being indicated by $V\angle 0$, $V\angle 120$, $V\angle 240$. First a blanking voltage, well above a threshold voltage is applied across all intersections. A voltage $V\angle 120$ is applied to each x electrode and a voltage $V\angle 240$ applied to each y electrode. This results in $V\angle 120 - V\angle 240 = \sqrt{3}\, V\angle 90$ across each intersection and $\sqrt{3}\, V$ is arranged to equal a sustaining voltage $V_s$ which is itself almost equal to threshold voltage $V_{th}$. Each intersection, now receiving $V_s$ continues to appear transparent for up to about 40 seconds depending upon how close $V_s$ is to the threshold voltage $V_{th}$ of the cell 1. To address the intersection $x_2y_2$ a voltage $V\angle 0$ is applied to both $x_2$ and $y_2$ electrodes resulting in zero volts across intersection $x_2y_2$. This causes a rapid relaxation of the liquid crystal layer 10 to its off light scattering condition. Meanwhile all other intersections continue to have 29 3 V applied. For example at intersection $x_2y_1$ the voltage on $x_2$ is $V\angle 0$ and on $y_1$ is $V\angle 240$ resulting in $V\angle 240 - V\angle 0 = \sqrt{3}\, V\angle 210$. Once the intersection $x_2y_2$ becomes light scattering return of $\sqrt{3}\, V$ has insufficient effect to make the intersection become transparent. Thus $\sqrt{3}\, V$ is re-applied across $x_2y_2$ in preparation for another intersection being addressed.

From the above it can be seen that a liquid crystal with a sensibly constant threshold voltage throughout the cells operating temperature range is required. With most cholesteric mixtures threshold voltages decreases with increasing temperatures. Therefore the sustaining voltage $V_s$ is arranged to be lower than $V_{th}$ since if $V_s$ becomes greater than $V_{th}$ the cell 1 ceases to display the desired information and the complete cell appears transparent.

This variation of $V_{th}$ with temperature is compensated for in this invention by ensuring a smectic to cholesteric phase occurs in the cell mixture 10 just below the ambient or operating temperature. The compensation arises as follows:

Let $V_{th}$ be threshold voltage;
P be pitch of the cholesteric molecular arrangement;
d be thickness of material layer 10;
$k_{22}$ be twist elastic constant;
$\epsilon_a$ be $(\epsilon_{11} - \epsilon_{\perp})$ = dielectric constant;
$\epsilon_o$ be dielectric constant of free space;

$$V_{th} = \frac{\pi^2 d}{P}\sqrt{\frac{k_{22}}{\epsilon_o \epsilon_a}}$$

For a typical cholesteric mixture $K_{22}/\epsilon_a$ decreases with increasing temperature whilst P remains almost constant. Thus $V_{th}$ also decreases with increasing temperature.

For a cholesteric mixture according to this invention the term $k_{22}/\epsilon_a$ also decreases with temperature but is compensated for by P which around the smectic to cholesteric change decreases considerably with increases in temperature. Thus $1/P \sqrt{k_{22}/\epsilon_o \epsilon_a}$ and hence $V_{th}$ remains approximately constant. Well above the smectic to cholesteric change P remains relatively constant.

Figure 3:
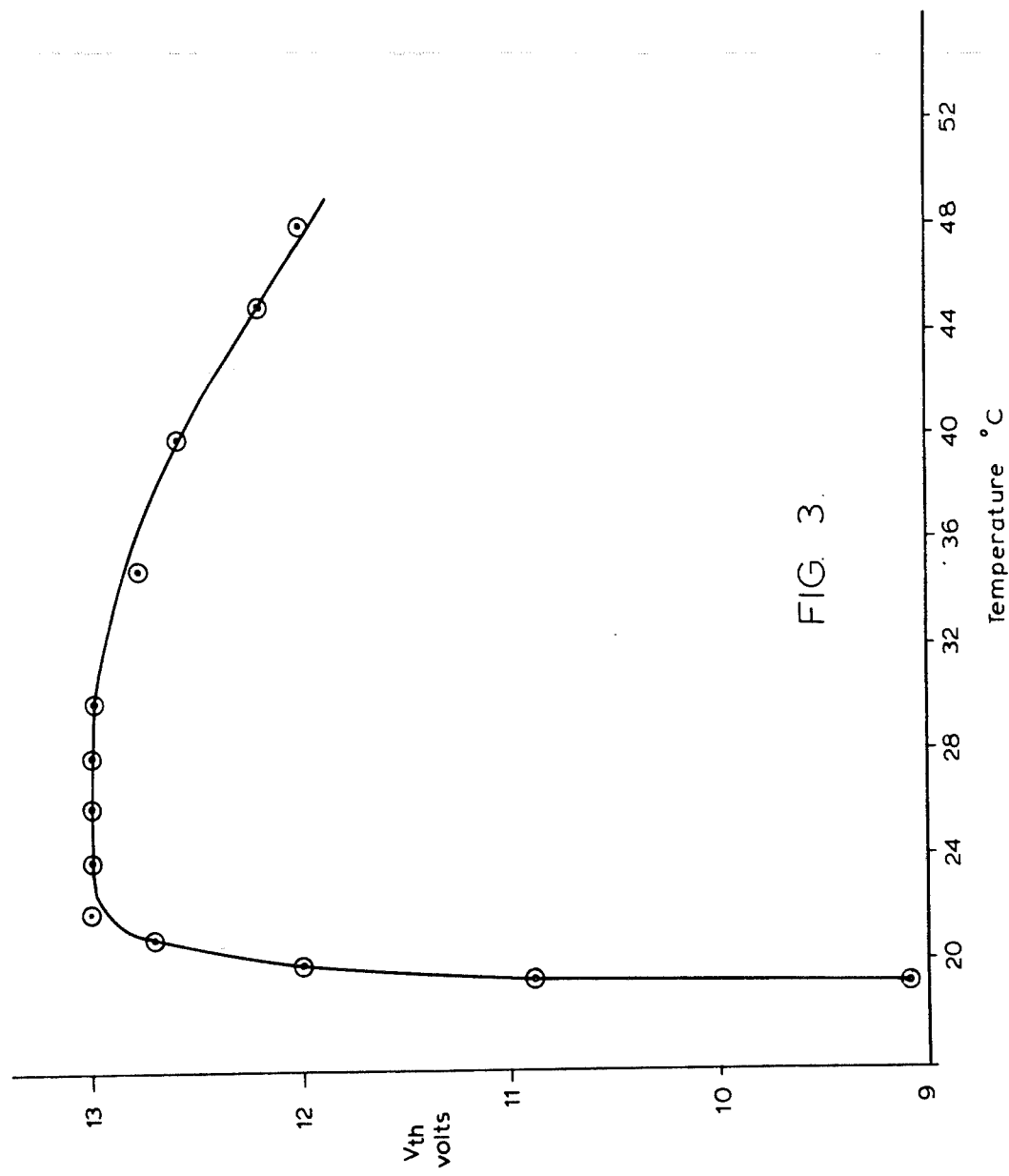

FIG. 3 shows how $V_{th}$ varies with temperature for the following mixture:

| | |
|---|---|
| $C_7H_{15}$—⌬—⌬—CN | 75 weight % |
| $C_8H_{17}O$—⌬—⌬—CN | 15 weight % |
| cholesteryl nonanoate | 10 weight %. |

This mixture has a smectic to cholesteric transition at 19° C. and a cholesteric to isotropic transition at 49.4° C. Over a temperature range 22° C. to 40° C. the variation in $V_{th}$ is about ±1.5% compared with ±3.9% for a typical mixture such as

| | |
|---|---|
| $C_5H_{11}$—⌬—⌬—CN | 62 weight % |
| $C_8H_{17}O$—⌬—⌬—CN | 28 weight % |
| cholesteryl nonanoate | 10 weight %. |

The mixture having the properties shown in FIG. 3 is prepared in a standard manner by mixing and heating the three materials in a suitable glass container. After cooling the mixture is ready for introduction between the glass slides 2, 3.

The compensation of $k_{22}/\epsilon a$ with P is applicable to Schiffs base, Esters, Azo, Azoxy materials as well as cyanobiphenyls as described above.

Suitable liquid crystal mixtures are obtained by choosing the operating temperature range which relates to the environment in which the display is set; using a proportion of cholesteric material the proportion being chosen to give an acceptable operating voltage and scattering off state; using a nematic material or mixture of nematic materials having a smectic to nematic transition at a temperature below the operating range. In a nematic mixture the smectic to nematic transition temperature is varied by varying the mixture proportions. Adding cholesteric material gives a smectic to cholesteric transition temperature which is usually different from the smectic nematic transition temperature of the nematic material and must be allowed for in determining the nematic material.

Examples of compensating $k_{22}/\epsilon a$ change with temperature for a variety of liquid crystal materials are shown in FIGS. 4 to 7.

Figure 4:
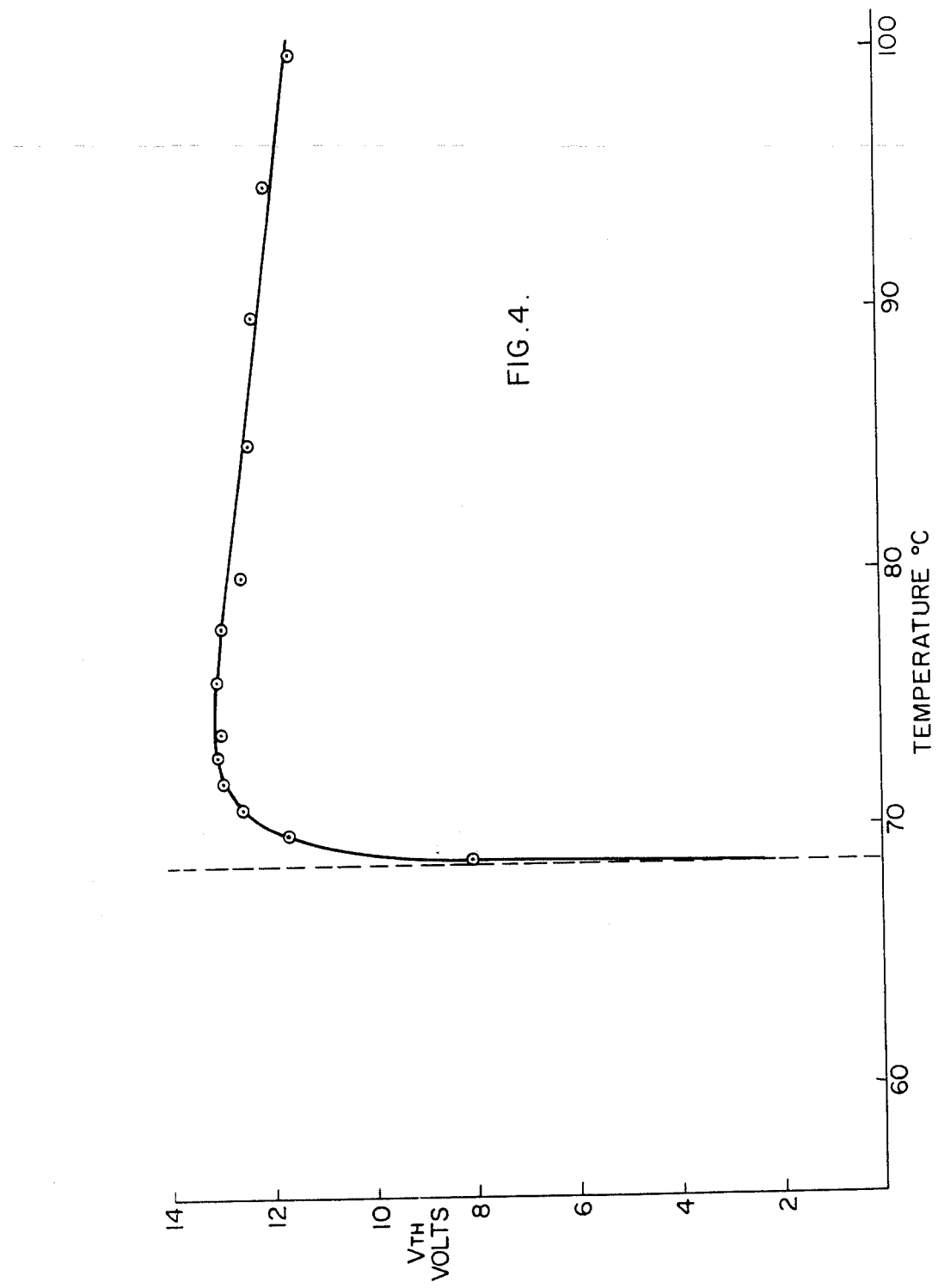

| FIG. 4. Schiffs base material. | weight |
|---|---|
| (i) NC—⌬—CH=N—⌬—CH=CHCOOC$_9$H$_{19}$ | 80% |
| (ii) R—⌬—CH=N—⌬—CN [available as ROTN 200] | 15% |
| (iii) Cholesteryl nonanoate | 5% |

This mixture has a smectic to cholesteric transition at 68.8° C. The material (i) has a smectic to nematic transition at 82° C. Increasing the proportion of (ii) (which does not have a smectic phase) will reduce the smectic to cholesteric transition.

Alternatively (i) may be replaced by a material having a lower smectic to cholesteric transition temperature.

Figure 5:
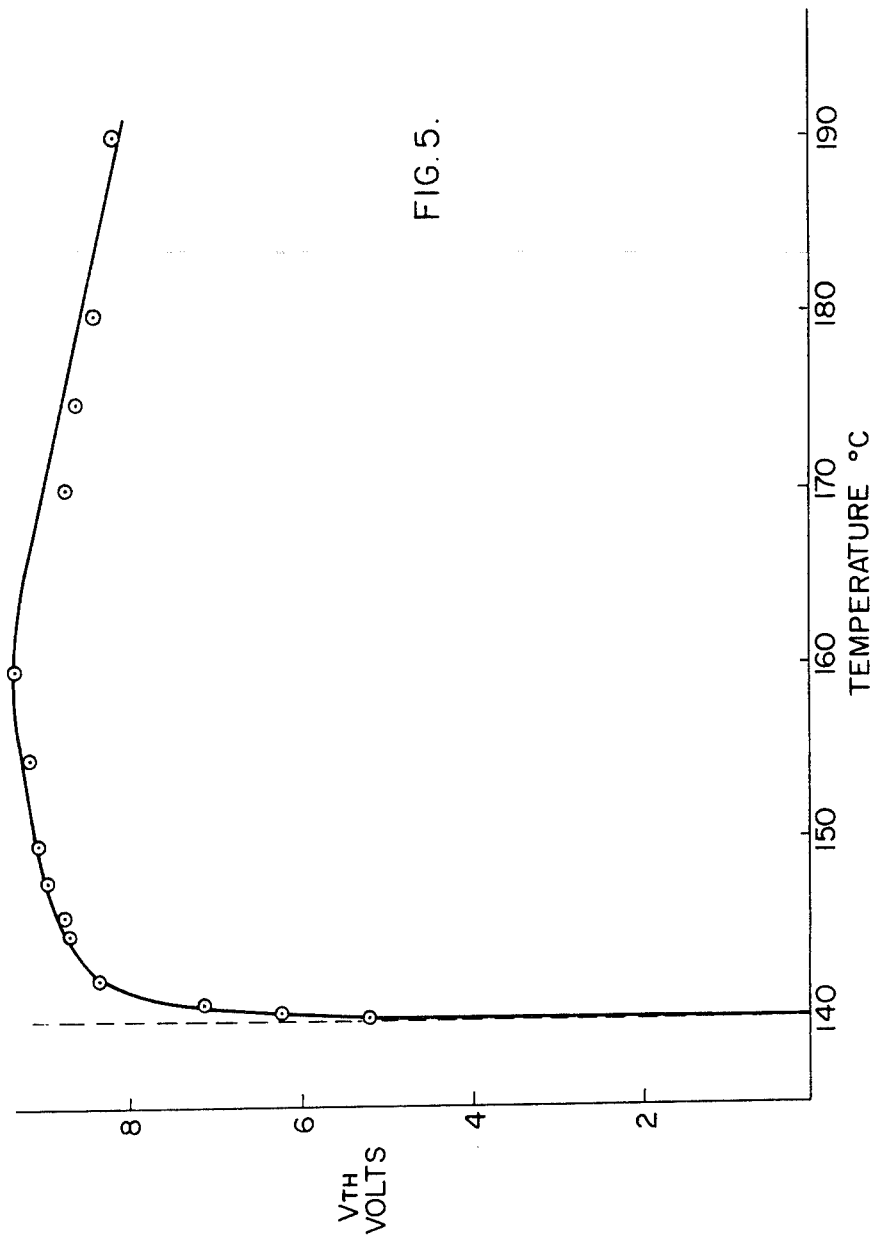

| FIG. 5. Esters. | Weight |
|---|---|
| (i) $C_7H_{15}$—⌬—COO—⌬—⌬—CN | 20% |
| (ii) $C_8H_{17}$—⌬—COO—⌬—⌬—CN | 70% |
| (iii) Cholesteryl nonanoate | 10% |

This has a smectic to cholesteric transition at 140° C. The material (ii) has a smectic to nematic transition at 183° C. Increasing the proportion of (i) will lower the smectic to cholesteric transition temperature of the mixture. Alternatively or additionally the material

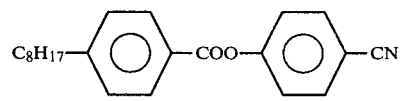

may be used instead of material (ii).

Figure 6:
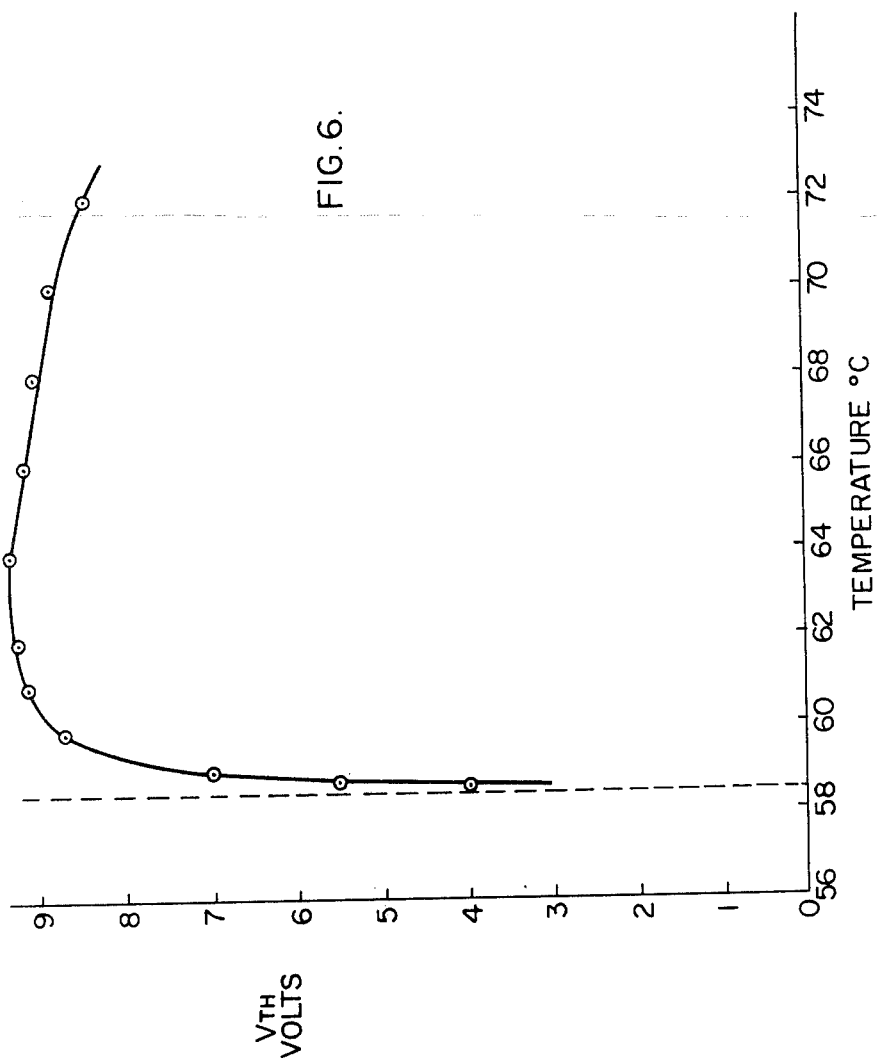

| FIG. 6. Cyano biphenyls. | Weight |
|---|---|
| (i) CH$_3$—CH$_2$—CH(CH$_3$)—CH$_2$—⌬—⌬—CN [CB 15] | 5% |
| (ii) C$_8$H$_{17}$O—⌬—⌬—CN | 95% |

This has a smectic to cholesteric transition at 58.5° C.

Material (ii) has a smectic to nematic transition at 67° C. The material

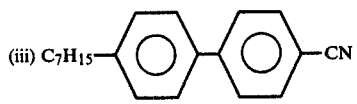

may be added to lower the smectic to cholesteric transition temperature. For example

|  | Weight | |
| --- | --- | --- |
|  | (a) | (b) |
| $C_7H_{15}$—⌬—⌬—CN | 58% | 48% |
| $C_8H_{17}O$—⌬—⌬—CN | 34% | 45% |
| $CH_3$—$CH_2$—$\overset{CH_3}{\underset{|}{CH}}$—$CH_2$—⌬—⌬—CN | 8% | 7% |

This has a smectic to cholesteric transition at (a) 5° C. and (b) 25° C.

| FIG. 7. Cyclo hexane esters. | Weight |
| --- | --- |
| (i) $C_7H_{15}$—⟨H⟩—COO—⌬—⌬—CN | 90% |
| (ii) cholesteryl nonanoate | 10% |

This has a smectic to cholesteric transition at 137.4° C. Material (i) has a smectic to nematic transition at 179° C. Other materials are

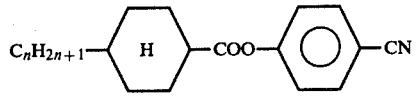

where n is an integer greater than 7. An example of an azoxy is

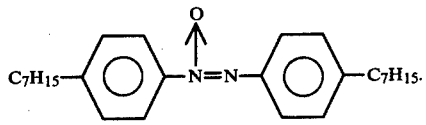

This has a smectic to nematic transition at 54° C. and has negative anisotropy. It is thus necessary to add a positive anistropy nematic and/or cholesteryl material e.g.

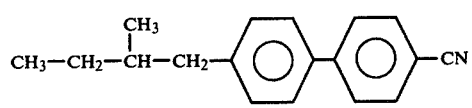

so the resulting mixture has a positive anisotropy.

I claim:

1. A phase change liquid crystal device comprising two spaced slides at least one of which is transparent, electrode structures on the facing surfaces of the slides, means for spacing the slides apart, and containing a thin layer of a cholesteric liquid crystal material between the slides, the cholesteric liquid crystal material being a mixture of at least one liquid crystal material having a smectic and a nematic phase with at least one liquid crystal material having a cholesteric phase, the complete mixture having a positive dielectric anistropy and having the following phases with increasing temperature, crystalline—smectic—chloesteric—isotropic, the smectic to cholesteric transition occurring below the operating temperature of the device at a value selected from within the temperature range 10° to 60° C. whereby changes in $k_{22}$ (twist elastic constant)/$\epsilon_a$ (dielectric constant) with temperature are at least partly compensated for by changes in cholesteric pitch P with temperature to stabilize the device threshhold voltage $V_{th}$ over a range of temperatures above the smectic to cholesteric transition temperature.

2. A device according to claim 1 wherein the cholesteric liquid crystal component is cholesterol nonanoate.

3. A device according to claim 1 wherein the smectic to cholesteric transition lies in the range 10° C. to 22° C. inclusive.

4. A device according to claim 1 wherein at least one of the liquid crystal materials having smectic to nematic transition is selected from the group of compounds having the molecular structure

where X is selected from the group $X = C_nH_{2n+1}$
$X = C_nH_{2n+1}$

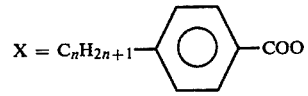

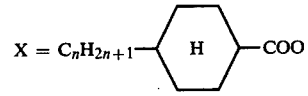

where n is an integer whereby the compounds exhibit smectic to nematic transition.

5. A device according to claim 1 wherein the at least one liquid crystal having a cholesteric phase has the molecular structure

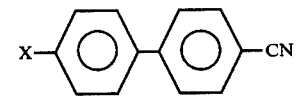

wherein X is an optically active alkyl group.